United States Patent [19]

Sweetland et al.

[11] Patent Number: 5,765,282
[45] Date of Patent: Jun. 16, 1998

[54] INTERNAL COMBUSTION ENGINE CYLINDER HEAD METHOD OF MANUFACTURE

[75] Inventors: Roger D. Sweetland; Timothy P. Webster, both of Columbus, Ind.

[73] Assignee: Cummins Engine Company, Inc., Columbus, Ind.

[21] Appl. No.: 670,657

[22] Filed: Jun. 26, 1996

[51] Int. Cl.$^6$ .................................................. B23P 15/00
[52] U.S. Cl. ........................................ 29/888.06; 29/527.6
[58] Field of Search ............................ 29/888.06, 527.6; 123/52.3

[56] References Cited

U.S. PATENT DOCUMENTS

| | | | |
|---|---|---|---|
| 2,710,602 | 6/1955 | Maybach . | |
| 3,491,731 | 1/1970 | Dinger et al. . | |
| 3,553,808 | 1/1971 | Koziara | 29/527.6 |
| 4,068,645 | 1/1978 | Jenkinson | 29/527.6 |
| 4,377,990 | 3/1983 | Seidl . | |
| 4,419,801 | 12/1983 | Yamashita et al. | 29/888.06 |
| 4,559,908 | 12/1985 | Flaig et al. . | |
| 4,653,161 | 3/1987 | Sanchez | 29/888.06 |
| 4,695,329 | 9/1987 | Hayashi et al. | 29/888.06 |
| 4,834,030 | 5/1989 | Bauer et al. . | |
| 4,969,263 | 11/1990 | Adams | 29/527.6 |
| 5,222,464 | 6/1993 | Oyaizu . | |
| 5,228,194 | 7/1993 | Broughton et al. . | |
| 5,333,581 | 8/1994 | Cagle | 29/888.06 |
| 5,419,037 | 5/1995 | Bailey | 408/1 R |
| 5,615,641 | 4/1997 | Koch et al. . | |
| 5,655,854 | 8/1997 | Foulk | 408/1 R |

FOREIGN PATENT DOCUMENTS

| | | |
|---|---|---|
| 0 238 879 A2 | 2/1987 | European Pat. Off. . |
| 1.551.339 | 12/1967 | France . |
| 3802886A1 | 8/1988 | Germany . |
| 4222801 | 1/1994 | Germany . |
| 4420130C1 | 11/1995 | Germany . |
| 3-78521 | 4/1991 | Japan . |
| WO80/00595 | 3/1980 | WIPO . |

*Primary Examiner*—Irene Cuda
*Attorney, Agent, or Firm*—Woodard, Emhardt, Naughton Moriarty & McNett

[57] ABSTRACT

Manufacture of a liquid cooled cylinder head for an internal combustion engine is described which reduces incidence of casting fins that may block or impede coolant flow through the cylinder head. The head is cast without internal liquid coolant passages to interconnect the first and second cooling cavities. An opening is machined through an outer surface of the head to define a passage interconnecting the first and second cooling cavities to provide for communication of cooling liquid therebetween. The opening formed by machining through the outer surface of the head is closed. Throat area of the the passage may be selected to control coolant exchange between the first and second cooling cavities and additional passages may be machined in each head to provide additional coolant interchange or to vent air from the cooling cavities.

16 Claims, 3 Drawing Sheets

INTERNAL COMBUSTION ENGINE CYLINDER HEAD METHOD OF MANUFACTURE

BACKGROUND OF THE INVENTION

The present invention relates to the manufacture of internal combustion engines, and more particularly, but not exclusively, the formation of cooling structures for a cylinder head.

The use of overhead valves in internal combustion engines is a common practice. In one configuration, multiple intake and exhaust valves are employed to improve engine performance and efficiency. Such cylinder heads are ordinarily cast from metal with a complex labyrinth of passageways and chambers in order to accomodate the multiple valve structure. U.S. Pat. Nos. 5,222,464 to Oyaizu and 2,710,602 are cited as examples of the intricate internal structure of various types of cylinder heads.

Frequently, the intricate structure of a cylinder head requires utilization of multi-core casting techniques. Furthermore, optimum performance of this type of structure usually requires fluid interconnection between cooling jacket chambers formed by different cores with relatively small passages. Properly casting these small interconnections can be difficult. Sometimes "casting fins" result within the interconnecting passages which threaten to block or impede desired coolant flow. The geometry of cooling jackets often makes casting fins difficult to detect and remove—leading to labor intensive rework. This rework adversely impacts producability of the cylinder head.

Thus, there is a need to improve cylinder head producability by reducing the occurrence of undesired casting fins.

SUMMARY OF THE INVENTION

One feature of the present invention is a method for making a liquid cooled cylinder head for a multi-valve internal combustion engine. This head has an outer surface that includes a first cooling cavity and a second cooling cavity. The method includes casting the head without integral liquid coolant passages connecting the first and second cooling cavities within the head. An opening is machined through the outer surface of the head to form a passage intersecting the first and second cooling cavities to provide for liquid coolant communication between the first and second cooling cavities within the head. The opening formed by machining in the outer surface of the head is then closed.

In another feature of the present invention, manufacture of a liquid cooled cylinder head for an internal combustion engine includes casting the head with a number of exhaust ports and a number of intake ports. A lower cooling jacket and an upper cooling jacket are also cast in the head. A first opening is machined through the outer surface of the head after casting to define a first passage interconnecting the upper and lower cooling jackets to provide for the flow of coolant therebetween. In addition, a second opening is machined through the outer surface of the head after the casting to define a second passage interconnecting the upper and lower cooling jackets to vent air when coolant is introduced. The first and second openings are then closed. The first passage has a larger throat area then the second passage with the second passage being positioned generally above the first passage.

Among the advantages of these features is that small interconnecting passages prone to the formation of casting fins typically do not need to be cast between the first and second cooling cavities. Instead, these passages are machined through the outer surface of the head. Generally, this approach improves cylinder head producability.

Accordingly, one object of the present invention is to provide a method of manufacture of a cylinder head which avoids the need to cast cooling jacket passages prone to rework. Instead, passages are machined through an outer surface of the head to provide desired interconnections.

Another object of the present invention is to improve producability of the cylinder head for an internal combustion engine by reducing occurrence of casting fins within passages interconnecting cylinder head cooling jackets.

Further objects, features, and advantages of the present invention will become apparent from the detailed description and drawings herein.

DESCRIPTION OF THE PREFERRED EMBODIMENTS

Figure 1:
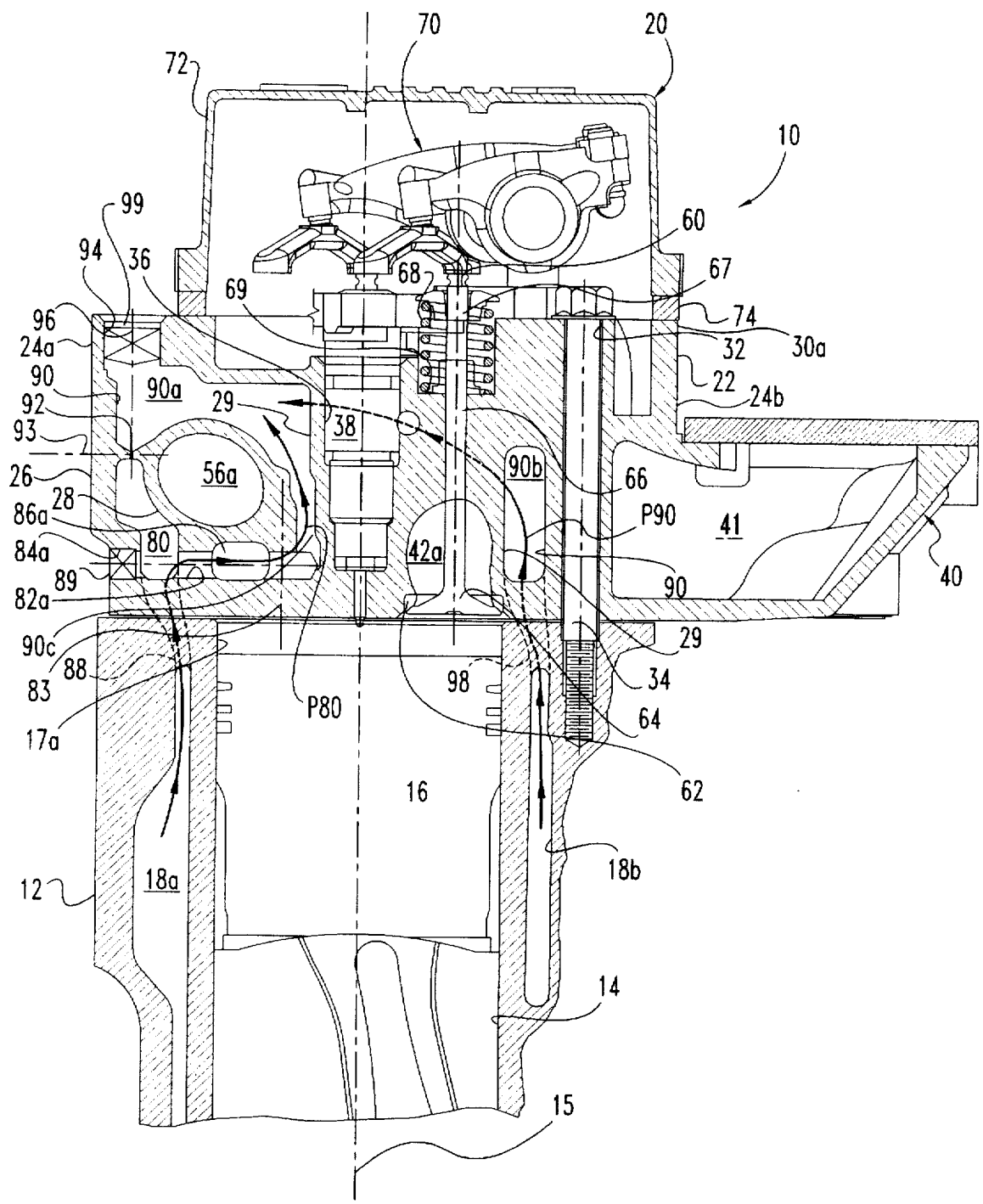
FIG. 1 is a partial front cross-sectional view taken through an internal combustion engine constructed in accordance with an embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 is a partial cross-sectional view of the multi-valve internal combustion engine 10 of the present invention. Engine 10 includes cylinder block 12 which defines cylinder bore 14 having a longitudinal axis 15. Cylinder block 12 also defines cooling chambers 18a, 18b. Piston 16 is situated within bore 14 and configured to reciprocate along axis 15 in a conventional manner. Bore 14 includes combustion chamber 17a situated between piston 16 and head assembly 20. Preferably, engine 10 includes a number of cylinder/piston assemblies (not shown) which are configured for conventional four cycle operation.

Head assembly 20 includes cast member 22 defining head 30a Preferably, cast member 22 is integrally cast from metal using a multi-core technique. U.S. Pat. No. 3,558,808 to Koziara is cited as an example of various coring techniques applied to cylinder heads. Cast member 22 includes outer walls 24a, 24b generally opposing each other and defining outer surface 26. In addition, cast member 22 includes a number of inner walls 28, 29 defining various chambers in head 30a.

Figure 2:
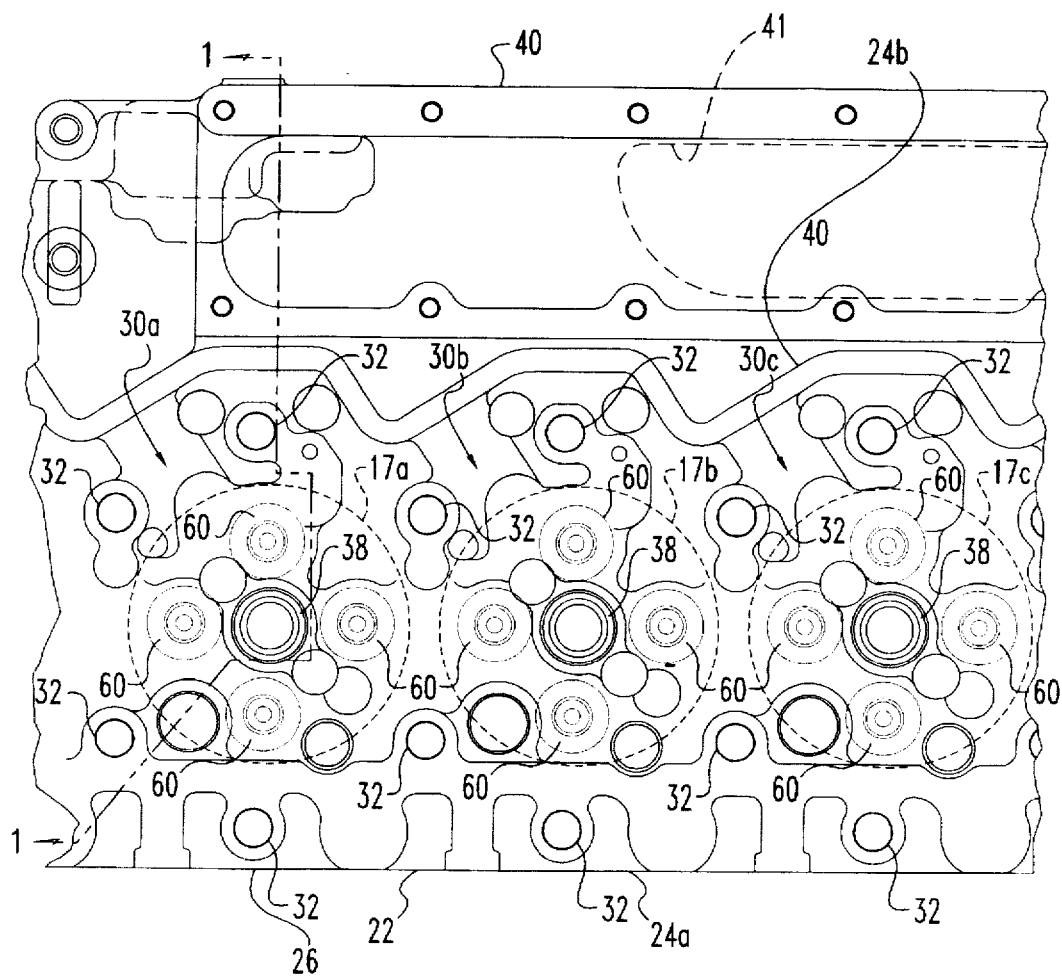
FIG. 2 is a top plan view of a portion of the engine shown in the embodiment of FIG. 1, indicating the partial cross-sectional view of FIG. 1 along the line 1—1.
Figure 4:
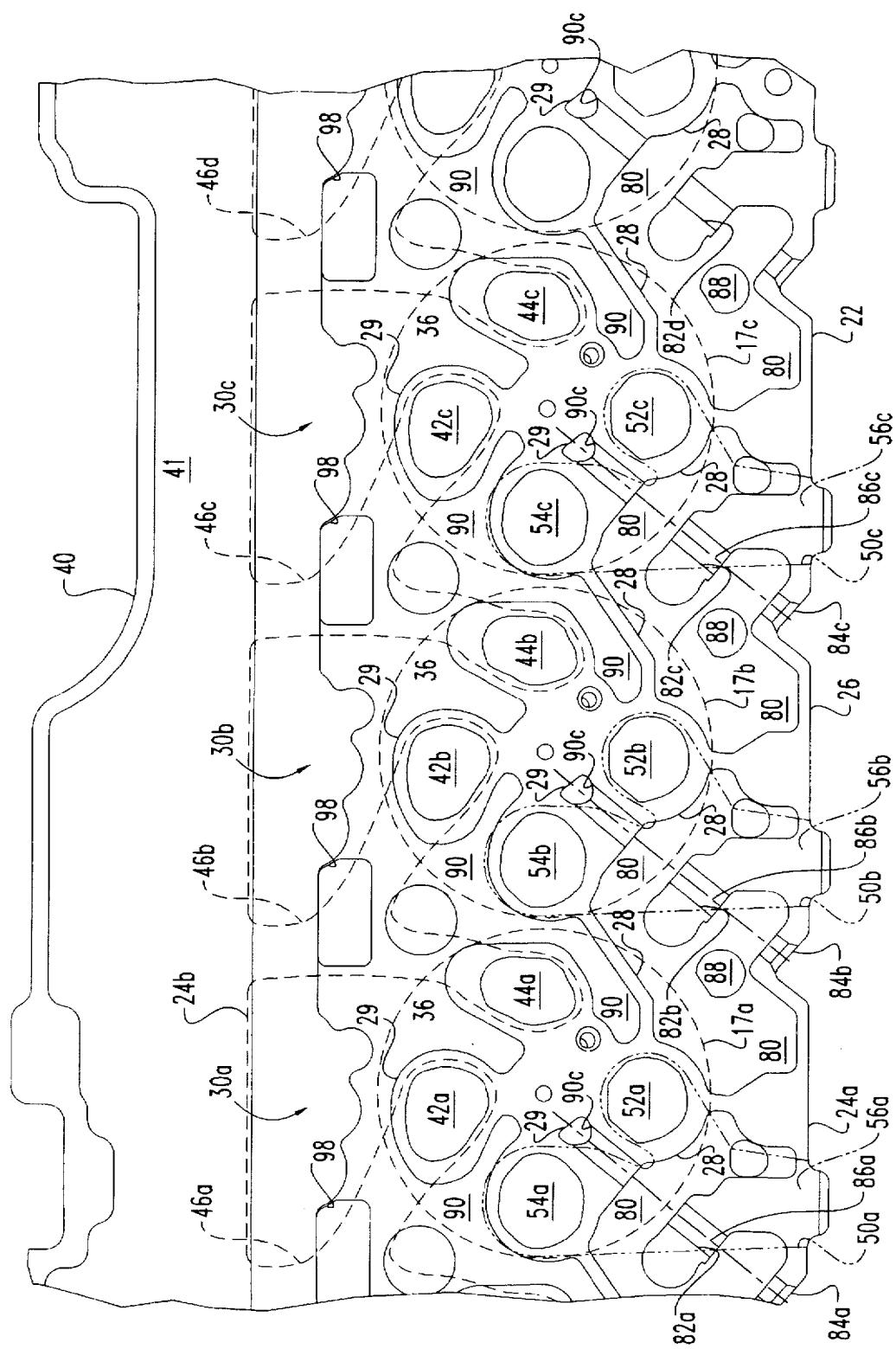
FIG. 4 is a cross-sectional view taken along the line 4—4 of FIG. 3.

Referring additionally to FIGS. 2 and 4, further details concerning the structure of cast member 22 are depicted. FIGS. 2 and 4 illustrate a portion of engine 10 including not only head 30a, but also heads 30b, 30c. The partial view of engine 10 in FIGS. 2 and 4 show heads 30a, 30b, 30c (collectively designated heads 30) integrally connected to each other in an in-line arrangement. Preferably, engine 10 has six in-line cylinder heads with corresponding cylinder/ piston assemblies (not shown). In other embodiments, a different number of cylinder heads or different cylinder head arrangement may be employed as would occur to one skilled in the art.

Cylinder heads 30 define a number of bolt bores 32. Bolt bores 32 are each configured to receive a corresponding head bolt 34 to secure cast member 22 to block 12. FIG. 1 provides an example of the interconnection of block 12 and member 22 with bolt 34 extending through a typical bolt bore 32. FIG. 2 illustrates a number of bolt bores 32 without corresponding head bolts 34 for clarity.

Each head 32 also defines an injector passage 36 configured to receive a fuel injector 38. Each injector 38 is configured to inject fuel into a corresponding combustion chamber 17a, 17b, 17c (collectively designated combustion chambers 17) in a conventional manner. FIGS. 2 and 4 depict combustion chambers 17 in phantom.

FIGS. 1, 2, and 4 also depict intake manifold 40 defining intake chamber 41. Head 30a includes two intake ports 42a, 44a in fluid communication with intake chamber 41. Similarly, heads 30b, 30c include intake ports 42b, 44b and 42c, 44c, respectively, in fluid communication with intake chamber 41. Intake passage 46a connects intake port 42a with intake chamber 41 as partially shown in phantom in FIG. 4. FIG. 4 also depicts, in phantom, intake passage 46b interconnecting intake ports 44a and 42b to intake chamber 41, intake passage 46c interconnecting intake ports 44b and 42c to intake chamber 41, and intake passage 46d interconnecting intake port 44c to intake chamber 41.

Figure 3:
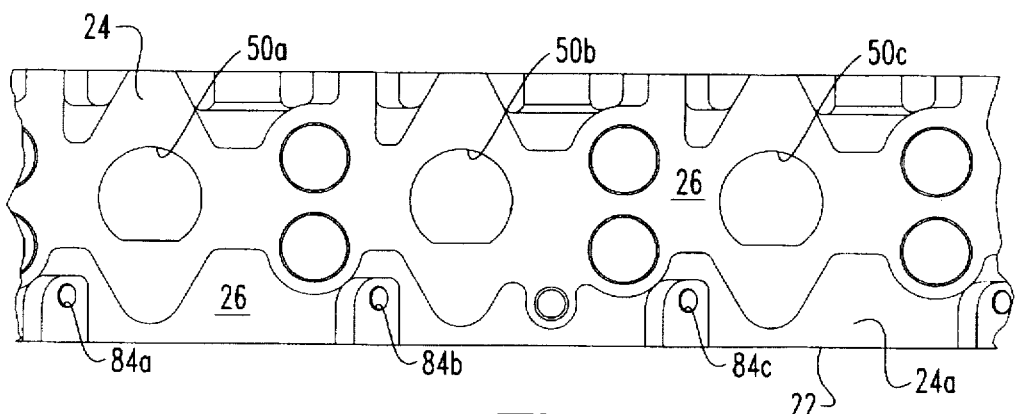
FIG. 3 is a side elevational view of the engine portion shown in FIG. 2.

Referring additionally to FIG. 3, each cylinder head 30 defines exhaust exit 50a, 50b, 50c, (collectively designated exhaust exits 50), respectively. As illustrated in phantom by FIG. 4, exhaust exit 50a is interconnected to exhaust ports 54a, 52a of cylinder head 30a via exhaust passage 56a, exhaust exit 50b is interconnected to exhaust ports 52b, 54b of head 30b via exhaust passage 56b, and exhaust exit 50c is interconnected to exhaust ports 52c, 54c of cylinder head 30c via exhaust passage 56c.

Referring specifically to FIGS. 1 and 2, a number of valve assemblies 60 are illustrated. Each intake port 42a, 42b, 42c, 44a, 44b, 44c includes a valve assembly 60 to control the flow of air from intake manifold 40 into the corresponding combustion chamber 17. Similarly, each exhaust port 52a, 52b, 52c, 54a, 54b, 54c includes a valve assembly 60 to control the exhaust of combustion products from the corresponding combustion chamber 17.

FIG. 1 depicts valve assembly 60 corresponding to intake port 42a in greater detail. Valve assembly 60 includes valve seat 62 which receives valve head 64. Valve stem 66 is integrally connected to valve head 64 and extends through head 30a. Opposing valve head 64 is terminal portion 67 of stem 66 which passes through spring 68. Spring 68 is situated in spring recess 69 on the top portion of head 30a opposite the lower portion containing seat 62. Spring 68 and stem 66 are configured to bias valve head 64 into seat 62 to prevent flow of air through intake port 42a. Valve assembly 60 is opened and closed by rocker load assembly 70 via push rods (not shown) or other appropriately timed means synchronized to the combustion cycle of engine 10. For each head 30, the opening and closing of the corresponding valve assemblies 60 is performed by a rocker load assembly 70 in a conventional manner. Similarly, injectors 38 are also timed to inject fuel into combustion chambers 17 as appropriate.

Head assembly 20 includes valve cover 72 connected to cast member 22 with an intervening orificed head gasket 74.

Preferably, the four overhead valve, fuel injection arrangement of in-line heads 30 is configured for diesel fueling with conventional compression ignition. In other embodiments, more or fewer valves may be employed and fuel may be introduced by other techniques besides injection. Furthermore, other types of fuel or engine ignition schemes may be used as would occur to one skilled in the art.

Referring specifically to FIGS. 1 and 4, cooling spaces for each cylinder head 30 are depicted. Cast member 22 defines a lower cooling jacket 80 depicted as an interconnected cooling chamber or cavity from one cylinder head to the next. Lower cooling jacket 80 is particularly depicted in FIGS. 1 and 4 which illustrate that lower cooling jacket 80 is generally positioned between outer wall 24a and inner wall 28. Upper cooling jacket 90 has portion 90a located generally above lower cooling jacket 80 and between outer wall 24a and inner wall 29. Upper jacket 90 also includes portion 90b generally positioned opposite cooling jacket 80 and between outer wall 24b and inner wall 29.

Lower cooling jacket 80 is in fluid communication with cooling chamber 18a of cylinder block 12 via passages 88. Similarly, upper cooling jacket 90 is in fluid communication with cooling chamber 18b of block 12 via passages 98. Passages 88, 98 interconnect cooling chambers 18a, 18b of block 12 through orificed head gasket 74, respectively.

Initially, cast member 22 is formed by a multi-core casting process with lower cooling jacket 80 and upper cooling jacket 90 being formed by separate cores. As cast, lower cooling jacket 80 and upper cooling jacket 90 lack any interconnecting passages between lower cooling jacket 80 and upper cooling jacket 90 within heads 30. As a result, liquid coolant cannot be exchanged between lower cooling jacket 80 and upper cooling jacket 90 within heads 30. Nonetheless, it is desirable to provide an interconnection between lower cooling jacket 80 and upper cooling jacket 90. In one preferred embodiment, this interconnection is provided by machining lower passage 82a, 82b, 82c (collectively designated passages 82) in each head 30a, 30b, 30c, respectively. Each lower passage 82 intersects lower cooling jacket 80 and upper cooling jacket 90 along a corresponding longitudinal axis 86a, 86b, 86c (collectively designated axes 86). Longitudinal axes 86 of passages 82 are generally horizontal and approximately perpendicular to longitudinal axis 15. Each lower passage 82 intersects upper cooling jacket portion 90c. Portion 90c is situated generally between exhaust ports 52 and 54 in the vicinity of injector passage 36 for each head 30. Also, upper jacket portion 90c is generally located between wall 28 and wall 29 for each head 30. Preferably, lower passage 82 is formed by machining an opening 84a, 84b, 84c (collectively designated openings 84) through outer surface 26 of cast member 22. In one embodiment, this machining is performed by drilling a generally horizontal bore through cast member 22. In other embodiments different machining methods are contemplated as would occur to one skilled in the art.

After lower cooling jacket 80 and upper cooling jacket 90 are interconnected, plug 89 is secured within opening 84, providing a seal to prevent loss of coolant from lower cooling jacket 80 or upper cooling jacket 90. Plug 89 may be joined with cast member 22 by welding, brazing, an adhesive, a threaded connection, or such other means as would occur to one skilled in the art.

Interconnection by passages 82 facilitates coolant flow along path P80 from chamber 18a, through lower cooling jacket 80, and into upper cooling jacket 90 as illustrated in FIG. 1. Similarly, FIG. 1 depicts path P90 corresponding to coolant flow from chamber 18b into upper cooling jacket 90 to combine with coolant received in upper cooling jacket 90 along path P80. This combined coolant then flows forward through the head where it exits (not shown). The exiting coolant encounters a thermostat and is processed through a heat exchanger, such as a radiator; and then circulates back to cylinder block 12 (not shown).

FIG. 1 also depicts vertical passage 92 formed by machining through surface 26 to form a second interconnection between lower cooling jacket 80 and upper cooling jacket 90. This vertical orientation generally aids in the venting of air when cooling fluid is introduced into jackets 80 and 90. Plug 99 is configured to be securely held in opening 94 to seal jackets 80 and 90, and may be secured within opening 94 using techniques utilized to secure plug 89 in opening 84. Vertical longitudinal axis 96 of passage 92 is generally parallel to longitudinal axis 15 and approximately perpendicular to axes 86.

Notably, the exchange of coolant between jackets 80 and 90 is generally controlled by the throat area of the interconnecting passages. As used herein, "throat area" refers to the minimum planar cross-sectional area of a passage perpendicular to the longitudinal axis of the passage. For example, as depicted by FIG. 1, the throat area of passage 82a corresponds to a plane containing the cross-sectional area of passage 82a and axis 83; where that plane is perpendicular to axis 86a. Similarly, the throat area of passage 92 corresponds to a cross-sectional planar area perpendicular to axis 96 which contains axis 93.

Preferably, the minimum throat area of lower passages 82 is considerably larger than the throat area of passage 92. In one preferred embodiment, the throat area of lower passages 82 is at least twice the minimum throat area of passage 92. In a more preferred embodiment, the minimum throat area of passages 82 are at least eight times the throat area of passage 92. In a most preferred embodiment, the minimum throat area of passages 82 are each at least twelve times the throat area of passage 92.

By machining passages 82, 92, the problems attendant to casting interconnections between lower cooling jacket 80 and upper cooling jacket 90 are avoided, including the difficulty of detecting and removing casting fins to assure adequate coolant communication within the labyrinthine cooling jackets required to optimize engine performance. In other embodiments, more or fewer externally machined interconnections may be used to provide adequate fluid communication between cooling spaces. In still other embodiments, external machining techniques may be combined with integrally casted interconnecting passages or other techniques to assure adequate fluid communication between desired spaces in the manufacture of a cylinder head.

All publications and patent applications cited in this specification are herein incorporated by reference as if each individual publication or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for making a liquid cooled cylinder head for a multi-valve internal combustion engine, the head having an outer surface and including a first cooling cavity and a second cooling cavity, comprising:
   (a) casting the head without any integral liquid coolant passages connecting the first and second cooling cavities within the head;
   (b) machining a first opening through the outer surface of the head to form a first passage intersecting the first and second cooling cavities to provide for liquid coolant communication between the first and second cooling cavities within the head; and
   (c) closing the first opening formed by said machining in the outer surface of the head.

2. The method of claim 1, further comprising selecting a throat area of the first passage to provide a desired flow rate of liquid coolant between the first and second cooling cavities.

3. The method of claim 1, wherein said machining includes drilling a bore into the head to form the first opening, and said closing includes inserting a plug in the first opening.

4. The method of claim 1, wherein the head includes an outer wall and a first inner wall spaced apart from the outer wall to define the first cooling cavity, a second inner wall spaced apart from the first inner wall to define the second cooling cavity, and the first passage passes through the outer wall, and the first inner wall to interconnect the first and second cooling cavities.

5. The method of claim 4, wherein the head defines an injector passage and the second inner wall is positioned between the second cooling cavity and the injector passage.

6. The method of claim 1, further comprising:
   (d) boring a second opening through the outer surface of the head to provide a second passage interconnecting the first and second cooling cavities; and
   (e) plugging the second opening formed by said boring through the outer surface of the head.

7. The method of claim 6, wherein the first passage has a first throat area, and the second passage has a second throat area smaller than the first throat area.

8. The method of claim 6, wherein the first passage has a first longitudinal axis, and the second passage has a second longitudinal axis generally perpendicular to the first longitudinal axis.

9. The method of claim 8, wherein:
   the first passage has a first throat area and the second passage has a second throat area smaller than the first throat area;
   said closing includes inserting a plug through the first opening;
   said machining includes drilling a bore into the head to form the first opening;
   the head defines at least two intake pathways and at least two exhaust pathways, and at least one of the exhaust pathways is located between the first and second cooling cavities; and
   the head includes an outer wall and a first inner wall spaced apart from the outer wall to define the first cooling cavity, a second inner wall spaced apart from the first inner wall to define the second cooling cavity, and the first passage passes through the outer wall, and the first inner wall to interconnect the first and second cooling cavities.

10. A method for making a liquid cooled cylinder head for an internal combustion engine, comprising:
 (a) casting the head with an outer surface and having a number of exhaust ports, a number of intake ports, a lower cooling chamber, and an upper cooling chamber;
 (b) machining a first opening through the outer surface after said casting to form a first passage intersecting the upper and lower cooling chambers to provide for flow of coolant therebetween, the first passage having a first throat area;
 (c) machining a second opening through the outer surface after said casting to form a second passage intersecting the upper and lower cooling chambers to vent air when coolant is introduced, the second passage being positioned generally above the first passage and having a second throat area substantially smaller than the first throat area; and
 (d) closing the first and second openings.

11. The method of claim 10, wherein the head includes an outer wall and a first inner wall spaced apart from the outer wall to define the first cooling chamber, a second inner wall spaced apart from the first inner wall to define the second cooling chamber, and the first passage passes through the outer wall, and the first inner wall to interconnect the first and second cooling chambers.

12. The method of claim 11, wherein the head defines an injector passage and the second inner wall is positioned between the second cooling chamber and the injector passage.

13. The method of 10, wherein the second passage is generally vertical to facilitate venting of air.

14. The method of 13, wherein the first passage is generally horizontal.

15. The method of claim 10, wherein said casting includes forming the upper cooling chamber so that coolant from the lower cooling chamber cannot reach the upper cooling chamber within the head.

16. The method of claim 10, wherein the first passage intersects the upper cooling chamber between a pair of exhaust ports adjacent a passage configured to receive a fuel injector.

* * * * *